3,037,048
PROCESS FOR THE PURIFICATION OF CRUDE DIMETHYL TEREPHTHALATE
Rudolf Lotz, Obernburg (Main), Germany, assignor to Vereinigte Glanzstoff-Fabriken A.G., Wuppertal-Elberfeld, Germany
No Drawing. Filed Jan. 11, 1960, Ser. No. 1,426
Claims priority, application Germany Jan. 14, 1959
3 Claims. (Cl. 260—475)

This invention relates to an improved method or process for the purification of a crude dimethyl terephthalate, and more particularly to the recovery of a very pure dimethyl terephthalate from a hot methanol solution which contains undesirable impurities. The invention is especially adapted to the purification of dimethyl terephthalate which has been regenerated by depolymerization of polyethylene terephthalate in the presence of methanol.

Polyethylene terephthalate waste products such as filaments, films, fabrics and similar textile materials which have become dirty or discolored, or otherwise spoiled or damaged, are advantageously decomposed or depolymerized by various known processes for the recovery of initial reactants and their reutilization for the production of the polyester. Dimethyl terephthalate is one of the preferred initial reactants and can be regenerated by depolymerizing and transesterifying polyethylene terephthalate in the presence of methanol. However, it is essential to obtain this initial reactant in very pure form for repolymerization by polycondensation.

The dimethyl ester of terephthalic acid is most simply separated in the regeneration process by precipitation from the hot methanol solution. However, a smooth recovery of the pure product is quite difficult because the crude mixture contains gelatinous-forming materials as impurities which make it impossible to separate the pure ester by centrifuging or filtering. The gelatinous-forming impurities consist primarily or substantially of oligomers, i.e. the low molecular weight decomposition products of the polyester which are still in polymer form, such as the dimers, trimers, tetramers, and the like. These undesirable gelatinous products prevent settling, sedimentation or centrifuging of the crystalline dimethyl terephthalate and will quickly clog filters so as to render them useless. Furthermore, purification cannot be achieved by the usual crystallization process. The use of active carbon or similar adsorbents does permit an extensive separation of the gelatinous-forming impurities, but these impurities are then lost in the overall process because they cannot be supplied as a recycle charge to the regeneration process nor can they be converted in a separate operation into dimethyl terephthalate. In addition, the use of active carbon is complicated, time-consuming and relatively expensive.

One object of the present invention is to provide an improved method of obtaining a substantially pure dimethyl terephthalate from its crude mixture containing gelatinous-forming impurities, the pure product being useful for polycondensation of the polyester.

Another object of the invention is to obtain a separation of gelatinous-forming impurities from the crude dimethyl terephthalate without employing adsorbents or the like which make it impossible to further treat the impurities. This object naturally leads to a greater yield of pure dimethyl terephthalate because the impurities can be returned for further depolymerization of the oligomers to the desired product.

Another object of the invention is to make possible a recovery of dimethyl terephthalate from crude mixtures which results from a failure of the equipment or the process in the depolymerization of polyethylene terephthalate. In this case, decomposition of the polyester is incomplete, and prior to the present invention, such unsuccessful charges have been considered worthless and could not be recovered for any reasonable cost.

These and other objects and advantages of the invention will be more readily appreciated upon consideration of the following detailed disclosure of the invention.

It has now been found in accordance with the invention that prior disadvantages and difficulties in the purification of a crude dimethyl terpahahalate mixture containing gelatinous-forming impurities can be overcome if the crude mixture in a hot methanol solution is cooled in a first stage at temperatures between about 58° C. and 48° C. so as to precipitate at least 50% of the dimethyl terephthalate, predominantly as large, elongated crystals which are easily separated from the remaining crystalline sludge which can then be centrifuged in a second stage, provided that the temperature of the second stage is not less than 27° C. The second stage temperature should also be less than that of the first stage, i.e. so that the desired crystalline product is not dissolved in the methanol. Precipitation of the large crystals is ordinarily substantially completed by cooling down to about 50° C., but the precipitation is advantageously continued down to about 48° C. in order to obtain the greatest amount of smaller crystals which can be separated by centrifuging in the second stage.

The precipitation and separating out of large crystals in the first stage is accomplished by cooling the crude mixture in the presence of methanol which is a part of the reaction mixture in the regeneration process. It is advantageous to employ at least about 2.5 parts by weight of methanol to 1 part of the crude mixture of dimethyl terephthalate and impurities. Larger amounts of methanol can also be employed without interfering with the purification, since the precipitation merely requires an inert solvent. The large crystals which crystallize from about 58° C. down to 50° C. are of a sufficient size that they settle rapidly in the methanol solution and can be readily separated from the bottom of crystallization vessel or by decantation. The precipitation of the large crystals should be continued until at least 50% of the dimethyl terephthalate in the crude mixture has been crystallized and separated as large crystals.

Crystallization can then be continued at about 48° C., until no more dimethyl terephthalate is precipitated out, and the precipitating crystal sludge is taken off at temperatures above 27° C. and immediately centrifuged. It is important that at least 50% of the dimethyl terephthalate be separated as large crystals in the first stage since otherwise the centrifuging in the second stage does not proceed satisfactorily. The gelatinous-forming impurities are separated from the smaller crystals of dimethyl terephthalate, but care must be taken that cooling does not proceed below 27° C. These impurities can again be subjected to a decomposition or depolymerization reaction and therefore are not lost in the process.

The invention is further illustrated by the following example which should be considered as illustrative only and not exclusive.

*Example*

110 kilograms of polyethylene terephthalate were decomposed by reaction with 440 kilograms of methanol in an autoclave at 200° C. and 40–50 atmospheres to produce a crude charge or mixture of crude dimethyl terephthalate in a hot methanol solution containing glycol and gelatinous-forming oligomers as impurities. The crude charge was run off into a crystallizer at normal pressure and a temperature of 58° C. and the content of dimethyl terephthalate in the crude charge was determined as 70% by weight. Thirty-six (36) kilograms of methanol were previously placed in the crystallizer, this amount corresponding to the alcohol consumed in the preceding decomposition reaction. As the temperature of the crude mixture in the crystallizer falls to 50° C. for a period of 45 minutes, crystallization of the dimethyl terephthalate continues until 50% of this product has precipitated in the form of elongated crystals, and these crystals are separated from the liquid medium. The crystallization is then completed at 48° C. and the contents of the crystallizer are led off at 48° C. and immediately conducted to a centrifuge. The smaller crystals of dimethyl terephthalate are separated from the crystalline sludge in the centrifuge before the temperature falls below 27° C. The large and small crystals of dimethyl terephthalate are collected, washed with methanol and dried. The dimethyl terephthalate obtained in this way is in substantially pure form with a sharp melting point of 140° C. The pure product is obtained in a yield of 70% based upon the amount of dimethyl terephthalate in the crude charge.

By comparison, if the crude mixture is brought from the autoclave into the crystallizer and permitted to cool down to 20° C., a highly gelatinous product is obtained which cannot be easily centrifuged and is still very contaminated with impurities. The melting point of this product is in a range of 129–137° C. It is impossible to obtain a pure dimethyl terephthalate from this product even by repeated washings with methanol or by recrystallization from methanol. The dimethyl terephthalate is not suitable for polycondensation to the polyester because of its impurity.

The invention is hereby claimed as follows:

1. An improved process for purifying a crude dimethyl terephthalate in a hot methanol solution containing gelatinous-forming impurities which comprises precipitating out from the crude at least 50% of the dimethyl terephthalate as large crystals in a first stage at temperatures between about 58° C. to about 48° C., and centrifuging the remaining crystalline sludge in a second stage at a temperature of not less than about 27° C. up to the temperautre of said first stage.

2. In a process for the depolymerization of polyethylene terephthalate in the presence of methanol and purification of the resulting crude mixture of dimethyl terephthalate in hot methanol for recovery of said dimethyl terephthalate, the improvement which comprises: cooling the crude mixture in a first stage at temperatures of from about 58° C. down to about 50° C. to precipitate predominantly large crystals of dimethyl terephthalate and further cooling the crude mixture down to about 48° C. to complete the precipitation; separating at least 50% of the dimethyl terephthalate as large crystals from the crude mixture; and centrifuging the remaining crystalline sludge in a second stage at a temperature of not less than about 27° C. up to the temperature of said first stage.

3. An improved process as claimed in claim 2 wherein the gelatinous-forming impurities are separated by centrifuging out the crystalline dimethyl terephthalate in the second stage and are returned for further depolymerization in the presence of methanol.

References Cited in the file of this patent

UNITED STATES PATENTS

| | | |
|---|---|---|
| 2,779,782 | Lotz | Jan. 29, 1957 |
| 2,828,330 | Sinn | Mar. 25, 1958 |